(12) United States Patent
Blanc et al.

(10) Patent No.: US 9,394,138 B2
(45) Date of Patent: Jul. 19, 2016

(54) METHOD AND SYSTEM FOR DAMPENING NOISE OR VIBRATION USING A MOTOR

(75) Inventors: Arthur Blanc, Providence, RI (US); Vladimir Blasko, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 535 days.

(21) Appl. No.: 13/990,117

(22) PCT Filed: Nov. 30, 2010

(86) PCT No.: PCT/US2010/058288
§ 371 (c)(1),
(2), (4) Date: May 29, 2013

(87) PCT Pub. No.: WO2012/074508
PCT Pub. Date: Jun. 7, 2012

(65) Prior Publication Data
US 2013/0240302 A1    Sep. 19, 2013

(51) Int. Cl.
*B66B 1/34* (2006.01)
*B66B 1/30* (2006.01)
*B66B 7/00* (2006.01)
*G01H 1/12* (2006.01)
*G01H 3/00* (2006.01)

(52) U.S. Cl.
CPC ... *B66B 1/30* (2013.01); *B66B 7/00* (2013.01); *G01H 1/12* (2013.01); *G01H 3/00* (2013.01)

(58) Field of Classification Search
CPC .............. B66B 1/30; B66B 7/00; G01H 1/12; G01H 3/00
USPC .................. 187/247, 289, 292, 293, 391, 393
See application file for complete search history.

(56) References Cited

U.S. PATENT DOCUMENTS

| | | | |
|---|---|---|---|
| 4,271,931 A | | 6/1981 | Watanabe |
| 5,325,036 A | * | 6/1994 | Diethert .................... B66B 1/06 187/289 |
| 5,828,014 A | * | 10/1998 | Goto ....................... F16F 15/02 187/292 |
| 5,959,266 A | | 9/1999 | Uchiumi |
| 6,089,355 A | | 7/2000 | Seki et al. |
| 6,229,277 B1 | | 5/2001 | Hakala et al. |
| 6,401,872 B1 | * | 6/2002 | Morishita ............... B66B 7/044 187/292 |

(Continued)

FOREIGN PATENT DOCUMENTS

| | | |
|---|---|---|
| CN | 1636854 A | 7/2005 |
| EP | 1930275 A1 | 6/2008 |

(Continued)

OTHER PUBLICATIONS

Chinese Search Report for application CN 201080070404.8, dated Feb. 17, 2014, 2 pages.

(Continued)

*Primary Examiner* — Anthony Salata
(74) *Attorney, Agent, or Firm* — Cantor Colburn LLP

(57) ABSTRACT

A system for active control of noise and/or vibration includes an electric machine; at least one sensor for sensing at least one of noise and vibration in the machine and generating at least one of an audio signal representing noise and a vibration signal representing vibration; a controller obtaining at least one of the noise signal and the vibration signal, the controller generating control signals to reduce at least one of noise and vibration in the machine; and power electronics receiving the control signals and generating drive signals for the machine.

17 Claims, 2 Drawing Sheets

(56) References Cited

U.S. PATENT DOCUMENTS

| | | | |
|---|---|---|---|
| 7,164,251 B2 | 1/2007 | Morishita | |
| 7,299,896 B1 | 11/2007 | Adifon et al. | |
| 7,401,683 B2 * | 7/2008 | Husmann | B66B 7/046 187/292 |
| 7,484,598 B2 * | 2/2009 | Tyni | B66B 5/0025 187/291 |
| 7,823,705 B2 * | 11/2010 | Ueda | B66B 5/0025 187/281 |
| 7,823,706 B2 * | 11/2010 | Tyni | B66B 5/0031 187/391 |
| 8,002,086 B2 * | 8/2011 | Ito | B66B 7/044 187/292 |
| 8,141,685 B2 * | 3/2012 | Utsunomiya | B66B 7/042 187/292 |
| 8,408,364 B2 * | 4/2013 | Kangas | B66B 1/3492 187/247 |
| 8,418,815 B2 * | 4/2013 | Encinas Carreno | B66B 5/0025 187/247 |
| 8,540,057 B2 * | 9/2013 | Schuster | B66B 1/34 187/247 |
| 8,849,465 B2 * | 9/2014 | Wang | B66B 7/042 187/282 |
| 2008/0230326 A1 | 9/2008 | Tyni et al. | |
| 2014/0008152 A1 * | 1/2014 | Annen | B66B 5/0037 187/247 |

FOREIGN PATENT DOCUMENTS

| | | |
|---|---|---|
| GB | 2266976 A | 11/1993 |
| GB | 2271865 A | 1/2011 |
| JP | 7257831 | 10/1995 |
| JP | 2000313570 A | 11/2000 |
| JP | 2001199644 A | 7/2001 |
| JP | 2003160281 A | 6/2003 |
| JP | 2007153497 A | 6/2007 |
| JP | 2007297180 A | 11/2007 |
| JP | 2011105435 A | 6/2011 |
| KR | 20050063723 A | 6/2005 |
| WO | 9826643 A2 | 6/1998 |
| WO | 9929032 A1 | 6/1999 |

OTHER PUBLICATIONS

PCT International Preliminary Report on Patentability and Written Opinion of the International Searching Authority for International Application No. PCT/US2010/058288, Jun. 13, 2013, 5 pages.

Notification of Transmittal of the International Search Report of the International Searching Authority, or the Declaration; PCT/US2010/058288; Aug. 22, 2011.

Notification of Transmittal of the Written Opinion of the International Searching Authority, or the Declaration; PCT/US2010/058288; Aug. 22, 2011.

* cited by examiner

METHOD AND SYSTEM FOR DAMPENING NOISE OR VIBRATION USING A MOTOR

BACKGROUND OF THE INVENTION

The subject matter disclosed herein relates to control systems and, more particularly, to a method and system for active noise and/or vibration control of systems such as an elevator system.

Elevators use a machine (e.g., electric motor and traction sheave) to drive belts or ropes coupled to elevator cars. The machines have structures (e.g., frames) that are designed to meet strength requirements first, leaving noise and vibration to a lesser priority. Noise and/or vibration in the machine can be sensed by occupants of the elevator car, thereby degrading the experience of traveling in the elevator. There is a need in the art for methods and systems for reducing noise and/or vibration in elevator systems.

BRIEF DESCRIPTION OF THE INVENTION

According to one aspect of the invention, a system for active control of noise and/or vibration includes an electric machine; at least one sensor for sensing at least one of noise and vibration in the machine and generating at least one of a noise signal representing noise and a vibration signal representing vibration; a controller obtaining at least one of the noise signal and the vibration signal, the controller generating control signals to reduce at least one of noise and vibration in the machine; and power electronics receiving the control signals and generating drive signals for the machine.

According to another aspect of the invention, a method for active control of noise and/or vibration in a system includes sensing at least one of noise and vibration at an electric machine to generate at least one of a noise signal and a vibration signal; generating control signals to reduce at least one of noise or vibration in the machine in response to at least one of the noise signal and the vibration signal; and generating drive signals for the machine in response to the control signals.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
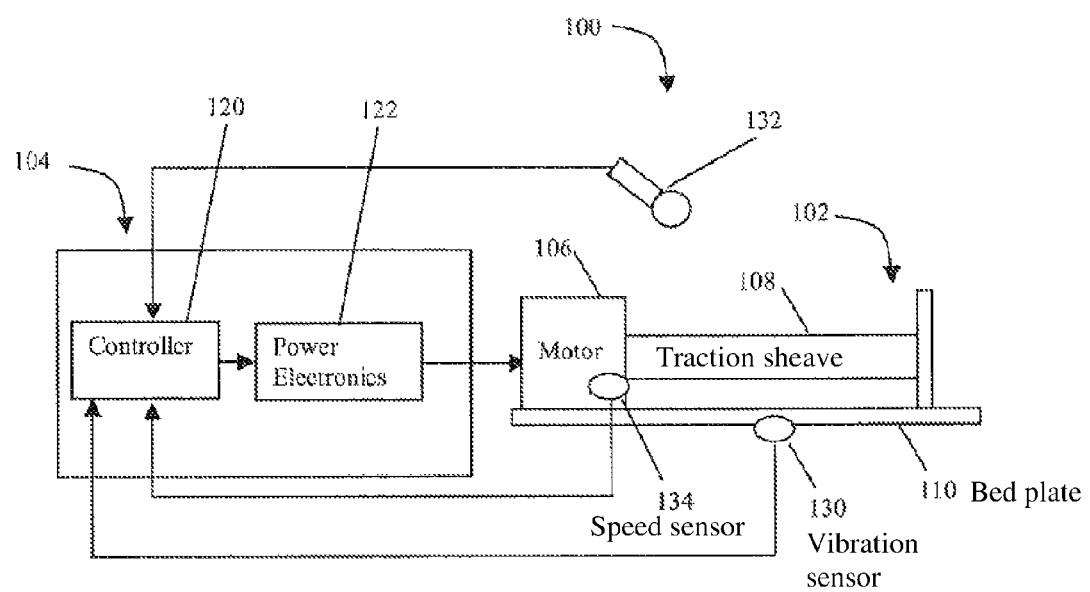
FIG. 1 is a block diagram of an elevator system.

FIG. 1 is a block diagram of various components of an elevator system 100 in exemplary embodiments. Components of the system 100 not required for an understanding of the present invention (e.g. guide rails, safeties, etc.) are not discussed below. System 100 includes two components, namely electric machine 102 and drive 104. Machine 102 imparts motion to the elevator car (not shown) and includes a motor 106 and a traction sheave 108. Motor 106 may be a brushless, permanent magnetic electric motor. In response to drive signals from drive 104, motor 106 turns the traction sheave 108. Rope(s) or belt(s) (not shown) are looped over traction sheave 108 and are coupled to the elevator car as known in the field. Motor 106 and traction sheave 108 may be mounted on a bedplate 110.

Drive 104 includes a controller 120 and power electronics 122. Controller 120 may be implemented using a general-purpose microprocessor executing computer program instructions stored in a computer readable storage medium. In alternate embodiments, controller 120 may be implemented in a peripheral integrated circuit element, a CSIC, ASIC or other integrated circuit, a logic circuit, a digital signal processor, a programmable logic device such as a FPGA, PLD, PLA or PAL, or any other device or arrangement of devices that is capable of implementing processes. Controller 120 is programmed to implement the functions described herein. As described in further detail herein, controller 120 generates control signals to compensate for noise and/or vibration in machine 102. Although shown in FIG. 1 as being adjacent the machine 102, drive 104 could be located at any suitable location.

Power electronics 122 receive control signals from the controller 120 and generate drive signals to the motor 106. The drive signals from power electronics 122, as a primary function, dictate the direction and speed of motor 106 to operate the elevator car through multiple modes. In present invention, the drive signals additionally serve to reduce noise and/or vibration by using the motor 106 as an actuator to generate specific vibrations to cancel noise-radiating vibrations of the machine 102 and therefore reduce noise radiation.

One or more sensors are employed around the machine 102 to gather information used by controller 120. One or more accelerometer or vibration sensors 130 may be mounted to a surface subject to vibration such as the bedplate 110 or motor 106 to detect structure-borne noise or vibration. An audio sensor (e.g., microphone) 132 may be mounted near the machine 102 to detect acoustic noise emanating from the machine 102. A speed sensor 134 (e.g., rotary encoder) detects the speed of the motor 106 and traction sheave 108. The speed sensor 134 may be mounted to a motor shaft or the traction sheave. In alternate embodiments, the speed of motor 106 is derived from the control signals issued by controller 120, eliminating the need for the speed sensor 134.

Figure 2:
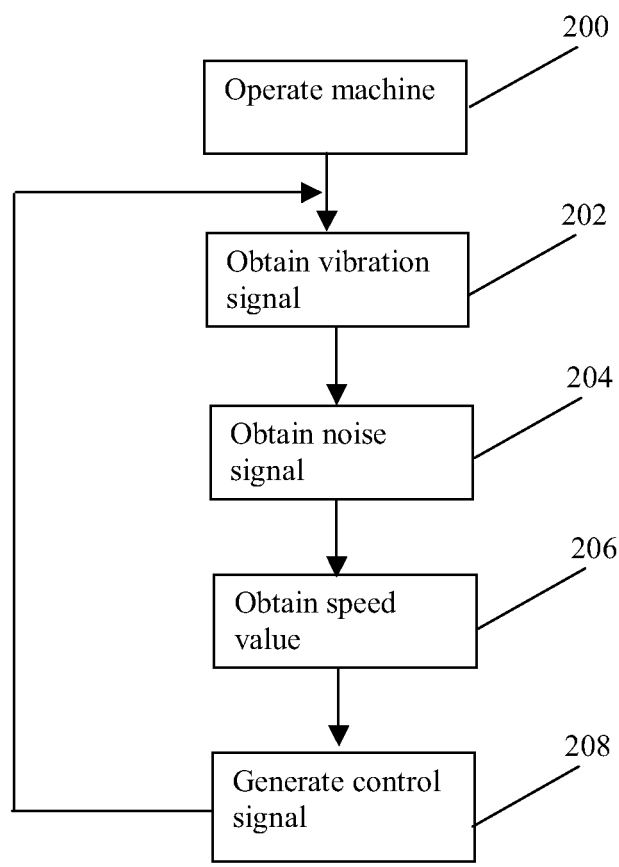
FIG. 2 is a flowchart of a process for active noise and/or vibration control.

FIG. 2 is a flowchart of exemplary processing implemented by the controller 120. The process begins at 200 where the machine is operated in typical fashion. In other words, the drive 104 controls the speed and direction of motor 106 in response to elevator calls and normal elevator operational states. At 202, controller 120 obtains a vibration signal from vibration sensor 130. At 204, controller 120 obtains a noise signal from audio sensor 132. At 206, controller 120 obtains a speed value, which may be derived from speed sensor 134 or derived internally by controller 120 based on control signals generated by controller 120.

At 208, controller 120 uses one or more of the speed value, the noise signal and the vibration signal to derive the control signals applied to the power electronics 122. The control signals include an operational component that dictates the motor speed and direction in response to elevator car requirements. The control signals also include a correction component to address noise and/or vibration detected by the audio sensor 132 and/or the vibration sensor 130. Controller 120 operates as part of a control loop to reduce spectral components of noise and/or vibration in the machine 102. The control algorithms in the controller 120 provide stable operation of the machine 102.

Controller 120 may filter the noise signal and/or vibration signal to target certain frequencies. Target frequencies may correspond to expected mechanical resonances from components of the machine 102. Other target frequencies may correspond to an electromagnetic (EM) harmonic (e.g., equal to or higher than the $6^{th}$ harmonic) from the machine 102. Adaptive control algorithms may be used to generate control signals to dampen vibration and/or noise in machine 102.

The power electronics 122 generate drive signals for motor 106 in response to the control signals from controller 120. The drive signals from power electronics 122 operate motor 106 as an actuator to control vibrations of the machine 102. The correction component of the control signals are incorporated in the drive signals to use the motor 106 to dampen vibration and/or noise sensed in the machine 102. Accordingly, the machine 102 continues to impart motion to the elevator car as intended, but also includes corrective forces to reduce or modify vibrations and/or noise in the machine 102 to improve user experience in the elevator car or in an adjacent room to the machine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for active control of noise and/or vibration, comprising:
    an electric machine having a motor and traction sheave;
    at least one sensor for sensing at least one of noise and vibration in the machine and generating at least one of a noise signal representing noise and a vibration signal representing vibration;
    a controller obtaining at least one of the noise signal and the vibration signal, the controller generating control signals to reduce at least one of noise and vibration in the machine; and
    power electronics receiving the control signals and generating drive signals for the machine, the drive signals driving the motor as an actuator to generate corrective forces to dampen at least one of noise and vibration in the machine.

2. The system of claim 1 wherein:
    the at least one sensor generating the noise signal is an audio sensor.

3. The system of claim 1 wherein:
    the at least one sensor generating the vibration signal is an accelerometer.

4. The system of claim 1 wherein:
    the at least one sensor generating the vibration signal is mounted to a bedplate of the machine.

5. The system of claim 1 wherein:
    the controller obtains a speed value indicative of a speed of the machine, the controller generating the control signals in response to the speed value and at least one of the noise signal and the vibration signal.

6. The system of claim 5 wherein:
    the controller obtains the speed value internally.

7. The system of claim 5 wherein:
    the controller obtains the speed value from an encoder in the machine.

8. The system of claim 5 wherein:
    the controller generates control signals to reduce at least one of noise and vibration in the machine in response to the noise signal, vibration signal and speed value.

9. The system of claim 1 wherein:
    the control signals include a correction component to reduce at least one of noise and vibration in the machine.

10. A method for active control of noise and/or vibration in a system, the method comprising:
    sensing at least one of noise and vibration at an electric machine to generate at least one of a noise signal and a vibration signal;
    generating control signals to reduce at least one of noise and vibration in the machine in response to at least one of the noise signal and the vibration signal;
    generating drive signals for the machine in response to the control signals; and
    applying the drive signals to a motor in the machine to reduce at least one of noise and vibration in the machine, the drive signals driving the motor as an actuator to generate corrective forces to dampen at least one of noise and vibration in the machine.

11. The method of claim 10 wherein:
    sensing vibration is performed at a bedplate of the machine.

12. The method of claim 10 further comprising:
    obtaining a speed value indicative of a speed of the machine, the generating the control signals to reduce at least one of noise and vibration in the machine is performed in response to the speed value and at least one of the noise signal and the vibration signal.

13. The method of claim 12 wherein:
    obtaining the speed signal is performed internally by a controller.

14. The method of claim 12 wherein:
    obtaining the speed signal is performed in response to an encoder in the machine.

15. The method of claim 12 wherein:
    generating control signals is performed in response to the noise signal, vibration signal and speed value.

16. The method of claim 10 wherein:
    the control signals include a correction component to reduce at least one of noise and vibration in the machine.

17. The method of claim 10 wherein:
    the electric machine is part of an elevator system that imparts motion to an elevator car.

* * * * *